United States Patent [19]

Matsui et al.

[11] Patent Number: 5,170,221
[45] Date of Patent: Dec. 8, 1992

[54] PARALLEL LIGHT RAY MEASURING APPARATUS

[75] Inventors: Keiji Matsui; Atsushi Ieki, both of Niwa, Japan

[73] Assignee: Okuma Corp., Aichi, Japan

[21] Appl. No.: 713,155

[22] Filed: Jun. 11, 1991

[30] Foreign Application Priority Data

Jun. 15, 1990 [JP] Japan ............................ 2-157197
Jun. 28, 1990 [JP] Japan ............................ 2-171061

[51] Int. Cl.$^5$ .............................................. G01J 1/06
[52] U.S. Cl. ................................. 356/121; 250/237 G
[58] Field of Search ...................... 356/121, 138; 250/237 G

[56] References Cited

U.S. PATENT DOCUMENTS

| | | | |
|---|---|---|---|
| 3,435,246 | 3/1969 | Webb | 356/121 |
| 4,231,662 | 11/1980 | Feinland et al. | 250/237 G |
| 4,459,027 | 7/1984 | Kafri et al. | 356/128 |
| 4,498,767 | 2/1985 | McGovern et al. | 356/121 |
| 4,800,547 | 1/1989 | Kessels et al. | 250/237 G |

Primary Examiner—Richard A. Rosenberger
Attorney, Agent, or Firm—Wenderoth, Lind & Ponack

[57] ABSTRACT

A parallel light ray measuring apparatus invention measures the parallelism of a light beam by: receiving a light beam which has passed through two gratings having the same grating period by means of at least two photoelectric converting elements, and by detecting the light intensity obtained from those aforementioned photoelectric converting elements and the phase difference between the periodic signals obtained when either of the gratings is moved, using the at least photoelectric converting elements. Further, the parallel light ray measuring apparatus includes: a first grating; a second grating having the same grating period as that of the first grating, and being disposed such that the grating lines of the second grating are in parallel with those of the first grating; a light pick-up screen for receiving a light beam which has passed through both gratings, whereby the light intensity distribution appearing on the light pick-up screen is detected so as to measure the parallelism of the light beam.

7 Claims, 7 Drawing Sheets

PARALLEL LIGHT RAY MEASURING APPARATUS

BACKGROUND OF THE INVENTION

The present invention relates to an apparatus for measuring parallel light rays and a measurement of the parallelism of light rays used for a sensor to which optics has applied.

There has been a wide use of optical sensors adopting various lasers. LEDs or the like as light sources. Many of these sensors employ parallel light rays as a part of the optical system. A parallel light ray can be formed of the combination of a light emitting section and a collimator lens in the case where the emitter is nearly a point such as an LED, laser diode and the like; alternatively, a parallel light ray can be formed of the combination of a light emitting section and a beam expander in the case of a He-Ne laser and the like. The quality of the parallel light ray, more specifically, the extent to which the light ray in the parallel light flux is parallelized has much effect on the performance of the sensor itself; as a result, the parallelism of a light ray is determined depending upon not only the performance of each optical device but also upon the relative positional accuracy between those optical devices. Accordingly, arranging each of optical devices needs a measuring apparatus for measuring the parallelism of a light ray with precision, and an adjusting apparatus for precisely shifting relative positions between each optical device and the devices.

The measurement of parallelism of a light ray by the conventional method has been carried out by measuring the distortion of the wave front of the light ray by means of an interferometer, and also performed in accordance with a noncoherent lamp or the light of an LED, by measuring and comparing the sizes of the light beam or light intensity distribution between in the close site and in the distant site, or by following up the the light ray using a pin hole.

The interferometer mentioned above for measuring the distortion of the wave front of the light ray is structurally complicated, and the processing of the obtained interference fringes is not a simple one. Furthermore, it has been difficult to perform a measurement when a laser ray which has a rather poor coherence is used since it exhibits poor contrast of the interference fringes. On the other hand, in the case where the size of the light ray and the light intensity distribution are measured, it is difficult to measure an exact contour; or the measurement takes much time, consequently, the conventional interferometer has exhibited a poor effectiveness.

SUMMARY OF THE INVENTION

The present invention has been accomplished in view of what is discussed above, and an object of the present invention is to provide a parallel light ray measuring apparatus capable of measuring and adjusting the parallelism of a light ray effectively in a simple structure, without depending upon whether the light ray is coherent or not.

According to one aspect of the present invention, for achieving the objects described above, there is provided a parallel light ray measuring apparatus comprising: a first grating; a second grating having the same grating period as that of said first grating, and being installed in such a manner that the grating lines are in parallel with those of said first grating; at least two photoelectric converting elements for detecting the light beam which, being originated from a light source unit to be measured, has passed through said both of said gratings; and a moving means which enables at least one of said first and second gratings to move in a transverse direction with respect to the grating lines on the plane to which the grating belongs, whereby the parallelism of the light ray of said light beam is measured using the light intensity obtained by said at least two photoelectric converting elements.

According to another aspect of the present invention, there is provided a parallel light ray measuring apparatus comprising a first grating; a second grating having the same grating period as that of said first grating, and being installed in such a manner that the grating lines are in parallel with those of said first grating; a light pick-up screen for receiving a light beam having passed through both of said gratings, whereby the light intensity distribution appearing on said light pick-up screen is detected so as to measure the parallelism of the light ray of said light beam.

These together with other objects, features and advantages of the invention will become more readily apparent from the following detailed description when taken in conjunction with the embodiment illustrated in the accompanying drawings.

DESCRIPTION OF THE PREFERRED EMBODIMENT

Figure 1:
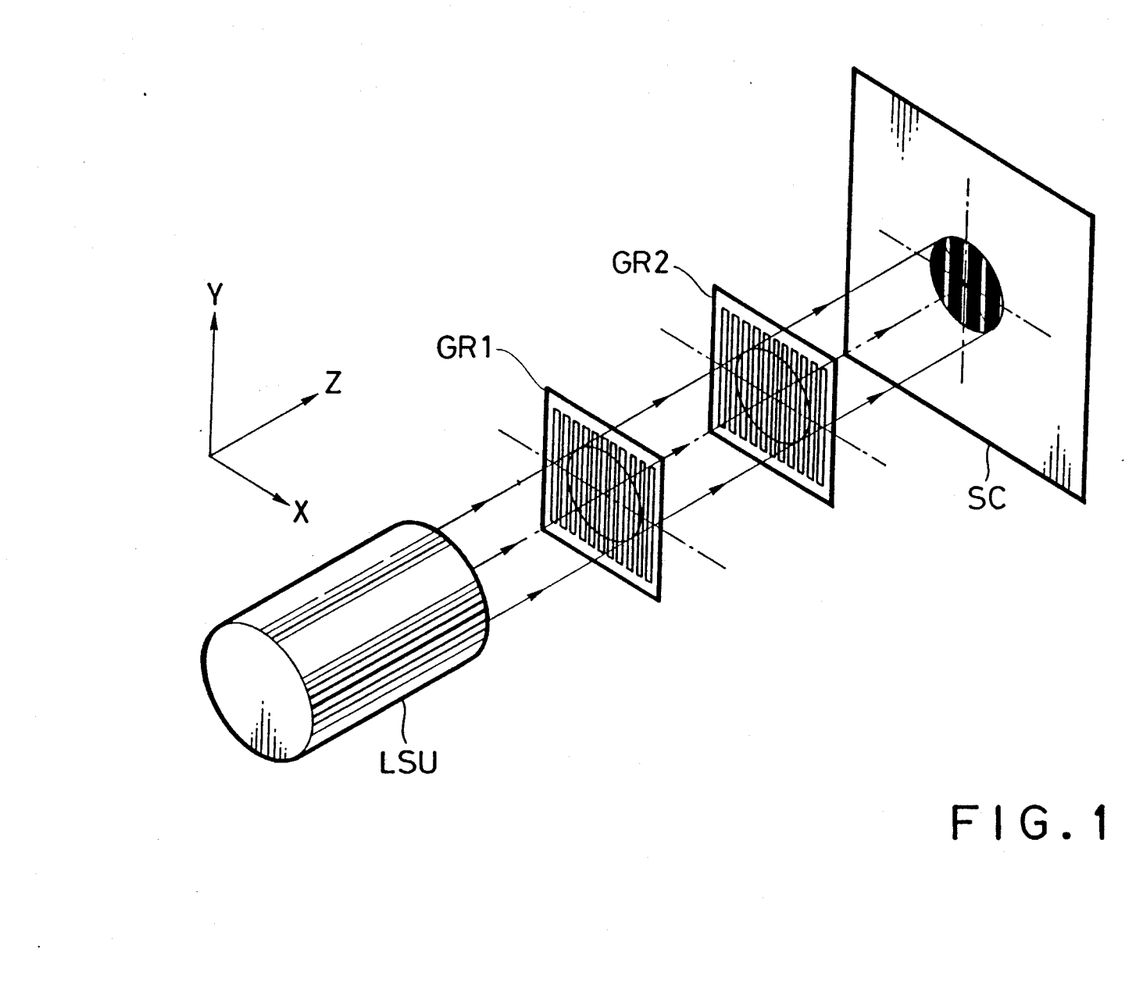
FIG. 1 is a construction view showing an example of the parallel ray measuring apparatus on which the apparatus of the present invention is based.

FIG. 1 is a construction view showing an example of the parallel light ray measuring apparatus on which the apparatus of the present invention is based. This apparatus comprises: a light source unit LSU for emitting parallel light ray; a first grating GR1 in which a transmission type diffraction grating having a predetermined grating constant is installed; a second grating GR2 in which a transmission type diffraction grating having the same grating constant as that of the first grating is installed, and a light pick-up screen SC which receives the light rays having passed through the first grating GR1 as well as the second grating GR2. Here, the surface of the first grating GR1 is set in parallel with the second grating GR2, and the grating lines of each grating are adjusted to be in parallel with those of the other.

In the case where the light rays from the light source unit LSU are a perfect parallel light beam, the light intensity distribution appearing on the light pick-up screen SC forms the same shape of the light intensity distribution at the site where the light is emitted from the light source unit LSU. Therefore, if the light intensity distribution at the site where the light is emitted from the light source unit LSU is uniform, a distribution having a uniform brightness is formed on the light pick-up screen SC within the range on which the light beam illuminates. In the case, however, where the light beam from the light source unit LSU tapers, that is, becomes narrower or wider in the direction of the X-axis, the light intensity distribution appearing on the light pick-up screen SC becomes uneven, yielding fringes for example, as shown in FIG. 1. The space S between these fringes is determined depending upon the grating constant P of the two gratings GR1 and GR2, the gap G between the two gratings GR1 and GR2, the distance D between the first grating GR1 and the light pick-up screen SC, and the parallelism of the light rays. Consequently, it is possible to measure the parallelism of the light ray by finding out the space S between the fringes.

The principle of the present invention described above will be explained with reference to FIG. 2, which shows a schematic diagram of FIG. 1 viewed from the Y-direction. Generally, a parallel light ray can be considered as a light beam which come from a point light source at infinity. On the other hand, a non-parallel light ray can be considered as a light beam originated from a point light source at a finite distance, or as a light beam converging at a point in a finite distance. In the discussion hereinafter, light beams will be considered which are emitted from a virtual virtual point light source LS which is located apart by a distance F from the first grating GR1 and have a tendency to become wider.

Figure 2:
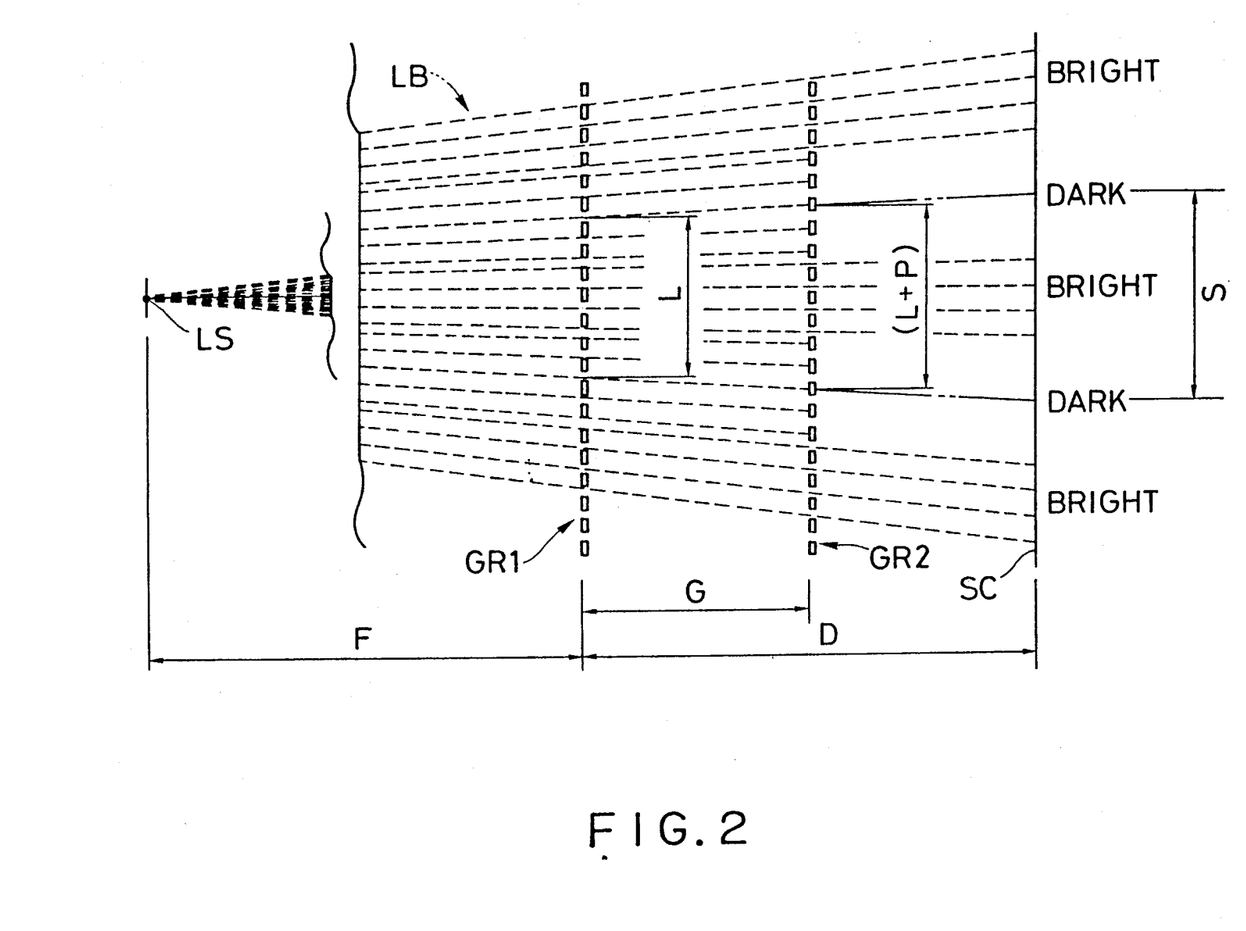
FIG. 2 is a diagram for explaining the principle of the present invention.

The light beam originated from the virtual light source LS, having passed through the first grating GR1 located at the site apart by the distance F, passes through a second grating GR2 set apart from the first grating GR1 by a gap G, and then reaches a light pick-up screen which is located at a site apart by a distance D from the first grating. It should be noted that both the gratings GR1 and GR2 have the same grating constant P. Due to the relative positional relationship between the first grating GR1 and the second grating GR2 as shown in FIG. 2, some of the light beams which passed through the first grating GR1, pass through the transparent portions of the second grating GR2, and reach the light pick-up screen SC and the remaining portions are blocked by the non-transparent portions of the second grating GR2. Therefore, repetitions of bright portions and dark portions, or fringes appear. Here, the space between a dark portion and the next dark portion is to be represented by S. Then, the directions of a pair of light rays which respectively reach a pair of dark portions should be focused on. If the space between the pair of light rays on the first grating GR1 is indicated by L, the space on the second grating GR2 is represented by (L+P), further, these relationships are represented by the following expression (1).

$$L/E = (L+P)/(F+G) = S/(F+D) \quad (1)$$

As a result, the location F of the virtual point light source LS, that is the parallelism of the light ray is determined using the space S between the dark lines by the following expression (2).

$$F = (S/P) \cdot G - D \quad (2)$$

Alternatively, by transforming an expression (4) hereinafter described with respect to S, $S=(P/G)\cdot(F+D)$ is obtained. This expression gives a knowledge that the magnification of measurement in this measurement system can be freely changed by adjusting G. In other word, even if the density of the fringes appearing on the light pick-up screen SC is affected by a large amount by the level of the parallelism of the light rays, the measurement can be carried out without replacing the gratings GR1 and GR2 by themselves by adjusting the gap G between the gratings GR1 and GR2 in order that the space between fringes may be easily measured. In addition, it is also possible to adjust the parallelism of the light rays with precision by gradually widening the gap G between the two gratings GR1 and GR2 from the stage in which the gap is small.

However, the parallel light ray measuring apparatus described above has been required to be provided with a CCD camera and TV monitor to analyze the fringes, thus disadvantageously making the apparatus larger. In addition, it has been difficult to judge whether or not when a final fine adjustment of the light beam was performed.

The parallel light ray measuring apparatus of the present invention for solving these problems will be detailed hereinafter.

Figure 3:
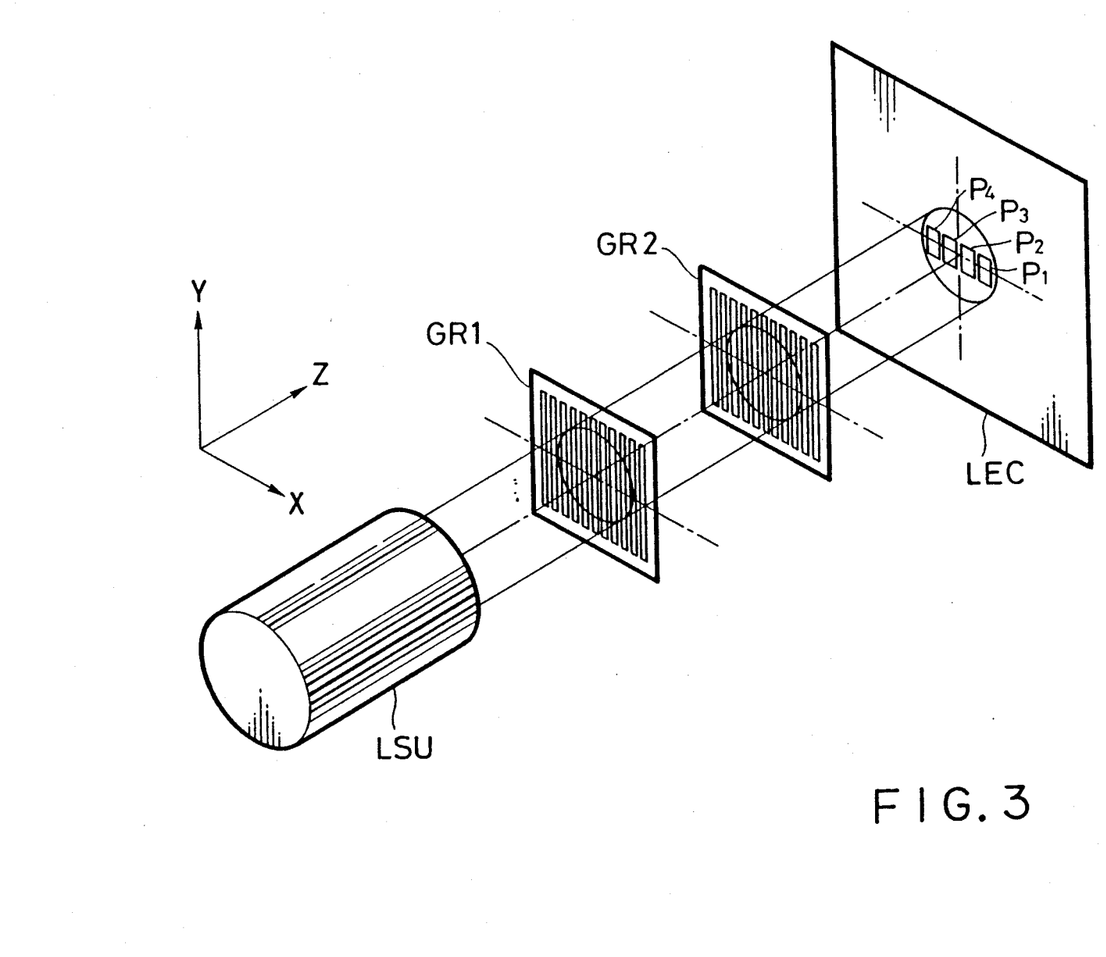
FIG. 3 is a construction view showing an example of the parallel light ray measuring apparatus of the present invention.

FIG. 3 is a construction view showing an example of the parallel light ray measuring apparatus of the present invention corresponding to FIG. 1. In this figure, the same elements as those of FIG. 1 are identified by the same numerals to save explanations. This parallel light ray measuring apparatus has, in place of the conventional light pick-up screen SC, a photoelectric converting section LEC having more than two photoelectric converting elements, to receive the light beam which has passed through the first grating GR1 and the second grating GR2. In this embodiment, four photoelectric converting elements P1, P2, P3 and P4 are installed in the photoelectric converting section LEC of this embodiment.

If the light beam from the light source unit LSU is perfectly parallelized, the light intensity distribution obtained by the photoelectric converting section LEC forms the same shape of the light intensity distribution at the site where the light is emitted from the light source unit LSU. Therefore, if the light intensity distribution at the site where the light is emitted from the light source unit LSU is uniform, a distribution having a uniform brightness is formed on the photoelectric converting section LEC within the range on which the light beam illuminates. In the case, however, where the light beam from the light source unit LSU tapers in the direction of the X-axis, the light intensity distribution obtained by the photoelectric converting section LEC becomes uneven, yielding voltage differences among the signals obtained by the photoelectric converting elements P1, P2, P3 and P4. These voltage differences are determined depending upon the grating constant P of the two gratings GR1 and GR2, the gap G between the two gratings GR1 and GR2, and the parallelism of the light ray. Consequently, it is possible to measure the parallelism of the light ray by finding out the voltage differences.

Figure 4:
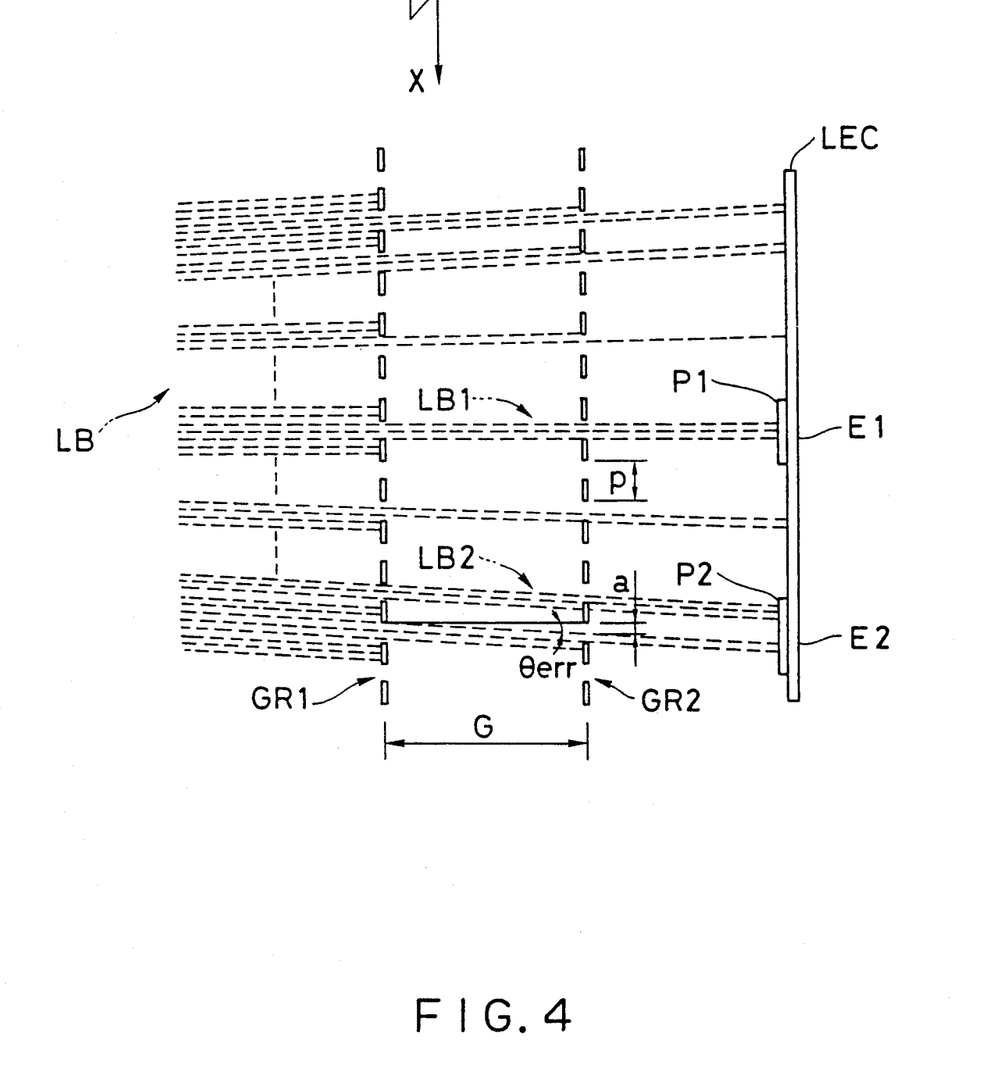
FIG. 4 is a diagram for explaining the principle of the present invention.

There will be followed a brief explanation of the principle of the present invention above described with reference to FIG. 4, which is a schematic diagram of FIG. 3 viewed from the Y-direction. The following discussion will be given in respect to the case where the light beam tends to become narrower.

The light beam LB from the light source unit LSU, passes through the first grating GR1, and then passes through the second grating GR2 placed apart from the first grating GR1 by the gap G, to reach the photoelectric converting section LEC installed at a certain distance from the first grating GR1. It should be noted that the grating constants of the gratings GR1 and GR2 have the same value P. Due to the relative positional relationship between the first grating GR1 and the second grating GR2 as shown in FIG. 4, some of the light rays which have passed through the first grating GR1, pass through the transparent portions of the second grating GR2, and reach the photoelectric converting section LEC and the remaining portions are blocked by the non-transparent portions of the second grating GR2. As a result, on the photoelectric converting section LEC appear the portions having high light intensities and the portions having low light intensities. Now, the following discussion refers to the light beam LB1 directed toward the photoelectric converting element P1 and the light beam LB2 directed toward the photoelectric converting element P2. Here, it is assumed that bright portions and dark portions of the first grating GR1 are exactly opposed to those counterparts of the second grating GR2 respectively. With this arrangement, the extent $\theta_{err}$ to which the light beam LB2 directed toward the photoelectric converting element P2, of the light beam LB deviates from being parallel to the light beam LB1, is denoted by the following expression (3).

$$\theta_{err} = \text{Arc TAN}\, (a/G) \qquad (3)$$

The above expression (3) is transformed to the following expression (4).

$$a = G \cdot \text{TAN}\, (\theta_{err}) \qquad (4)$$

Figure 5:
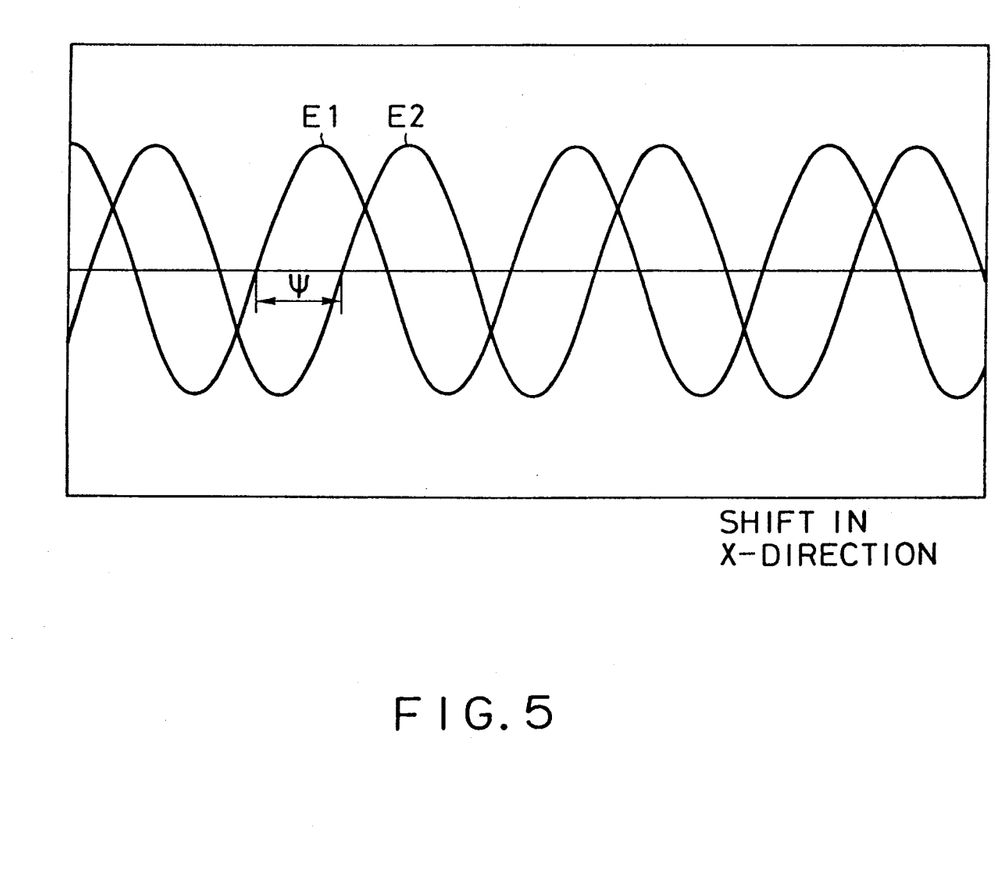
FIG. 5 is a diagram showing an example of a signal wave used in the present invention.

Under these conditions, moving either the first grating GR1 or the second grating GR2 in the X-direction causes periodic signals E1 and E2 in the photoelectric converting elements P1 and P2, respectively. Theses signals have a phase difference $\psi$ therebetween (with reference to FIG. 5). The phase difference $\psi$ between the periodic signals E1 and E2 plays a role as a parameter to give an information of the parallelism of the light beam, and represented by the following expression (5).

$$\psi = (a/P) \cdot 2\pi\, (\text{rad}) \qquad (5)$$

From the above expression (5), $a = \psi \cdot P/2\pi$ is obtained and substituted in the aforementioned expression (3), then the following expression (6) can be obtained.

$$\theta_{err} = \text{Arc TAN}\, (\psi \cdot P/(2\pi \cdot G)) \qquad (6)$$

From the consideration described above, it can be known that the parallelism can be determined from the phase difference $\psi$ between the signals E1 and E2 respectively obtained from the photoelectric converting elements P1 and P2, the known grating constant P of the two gratings GR1 and GR2, and the gap G between the two gratings GR1 and GR2.

It can be also known that the measuring magnification of this measurement system is arbitrarily changeable. Particularly, by adjusting the gap G between the two gratings GR1 and GR2, it is possible, without replacing the gratings GR1 and GR2 themselves, to perform not only a measurement of parallelism with a high resolution but also a measurement of parallelism having a wide range. By taking advantage of this property, it is possible to perform an adjustment to parallelize the light ray exactly when the gap G between the two gratings GR1 and GR2 is gradually being widened from the site at which the gap is small.

Figure 6:
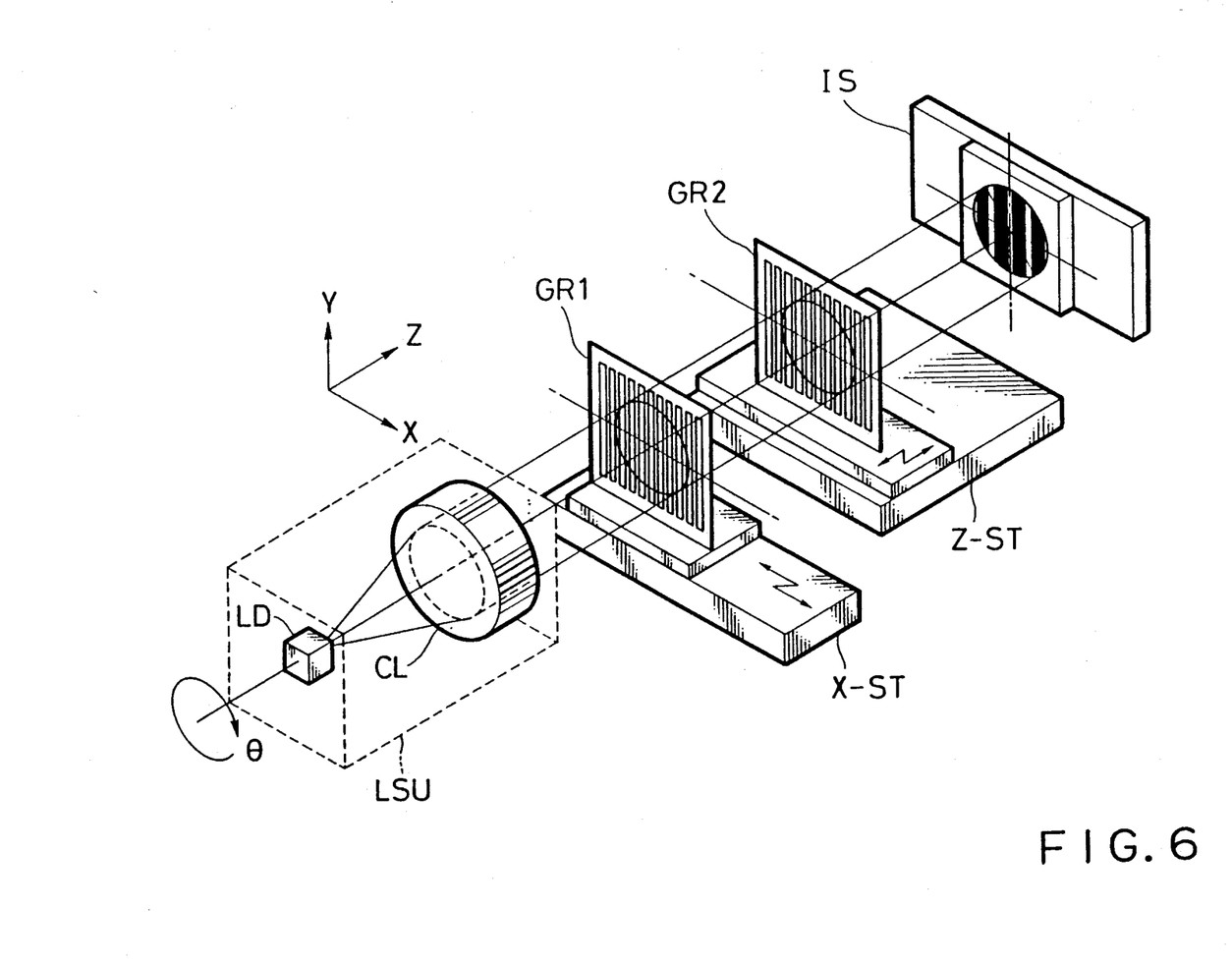
FIG. 6 is a construction view showing still a further example of the present invention.

FIG. 6 is a construction diagram showing another example of the parallel light ray measuring apparatus of the present invention. This figure corresponds to FIG. 1 and the same elements are identified by the same numerals to save explanations. The apparatus of this example is provided with an X-stage X-ST which enables the first grating GR1 to move in the X-direction, a Z-stage Z-ST which enables the second grating GR2 to move in the Z-direction and an image sensor IS which picks-up the light beams which have passed through the first grating GR1 and the second grating GR2. The light source unit LSU comprises a laser diode LD, a collimator lens CL and an adjusting mechanism (not shown) for changing the relative position between the laser diode LD and the collimator lens CL.

In this construction, the operation will be followed with the example in which the focal length of the laser diode LD and the collimator lens CL are adjusted. It is assumed as an initial state that light rays originated from the unadjusted light source unit LSU, pass through the two gratings GR1 and GR2 to enter the image sensor IS, and that the gap G between the first grating GR1 and the second grating GR2 has been adjusted so as to cause a proper number of fringes to appear on the image sensor IS. Based only on the space between fringes on the image sensor IS and the aforementioned expressions (1) and (2), the virtual focal position of the light source unit LSU, that is, the parallelism of the light rays, is calculated. It should be noted, however that the space between fringes gives no information on whether the light ray tends to become wider or narrower. This information can be obtained by shifting the X-stage X-ST slightly. More specifically, if the X-stage X-ST is shifted to a slight extent, the fringes are scanned in the X-direction. The direction of the scanning changes depending upon the taper of the light rays, or, whether the light ray becomes wider or narrower. Accordingly, the feature of the light ray can be known by measuring the space of the fringes and the scanning direction, and the existing error from the parallel is corrected by means of the mechanism shifting the relative position between the laser diode LD and the collimator lens CL. Next to this, the second grating GR2 is moved toward the image sensor IS to widen the gap G so to increase the magnification, and then the same measurement and adjustment as before is made. The repetition of these operations makes it possible to accurately parallelize the light rays.

Figure 7:
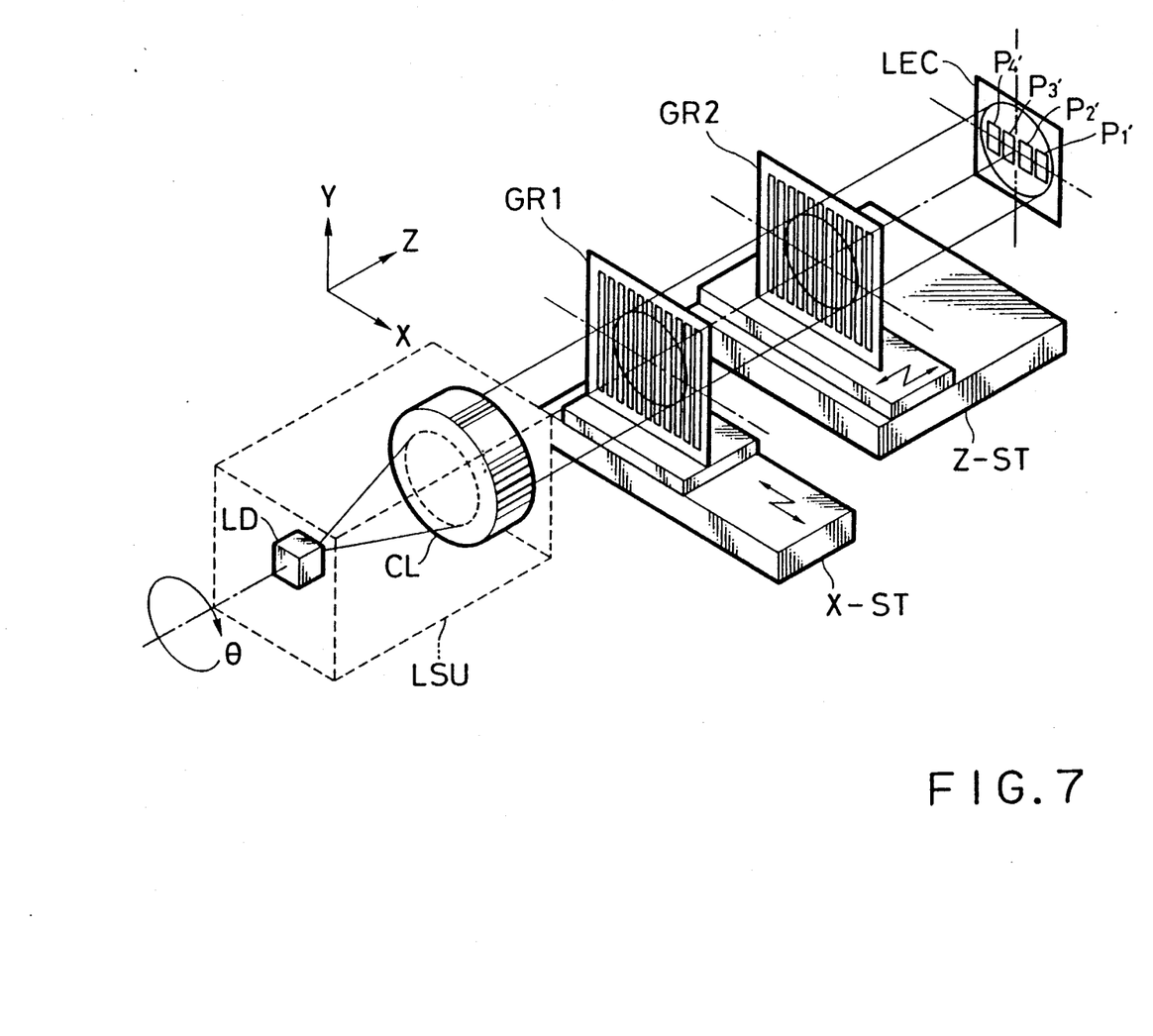
FIG. 7 is a construction view showing another example of the parallel ray measuring apparatus of the present invention.

FIG. 7 is a construction diagram showing another example of the parallel light ray measuring apparatus of the present invention. This figure corresponds to FIG. 3 and the same elements are identified by the same numerals to save explanations. The apparatus of this example is provided with an X-stage X-ST which enables the first grating GR1 to move in the X-direction, a Z-stage Z-ST which enables the second grating GR2 to move in the Z-direction and photoelectric converting section LEC comprising photodiodes P1', P2', P3' and P4'. Here, it is also possible that the Z-stage Z-ST is applied to the first grating GR1 and the X-stage X-ST is allotted to the second grating GR2. The light source unit LSU comprises a laser diode LD, collimator lens CL and an adjusting mechanism (not shown) for changing the relative position between the laser diode LD and the collimator lens CL.

Here, it should be noted that a precise focusing mechanism is needed in order to obtain a perfect parallel light ray. The operation of the focusing mechanism will be explained hereinafter with reference to an example of the adjustment of the focal distance of the laser diode LD and the collimator lens CL. It is assumed as an initial state that a light beam originated from the unadjusted light source unit LSU, having passed through the two gratings GR1 and GR2 to impinge on the set of photodiodes and that the gap G between the first grating GR1 and the second grating GR2 has been adjusted so as to cause a certain voltage difference between the respective outputs E1 and E4 of the photodiodes P1' and P4'. Here, the movement of the X-stage X-ST causes the photodiodes P1' and P4' to generate periodic signals E1 and E4 having a phase difference $\psi$ therebetween. This phase difference $\psi$ gives an information on the parallelism in terms of the aforementioned expression (6). The trend of the taper of the light beam, that is, whether the light beam tends to become wider or narrower can be determined by the information on the positional relationship between the moving direction of the X-stage X-ST and the signal. From this judgement, the error is to be amended by means of the mechanism which changes the relative positional relationship between the laser diode LD and the collimator lens CL. At the first stage of this adjustment, a rough adjustment is made in the state in which the gap G between the first grating GR1 and the second grating GR2 is small, and then the second grating GR2 is gradually moved toward the set of photodiodes by means of the Z-stage Z-ST so that the gap G between the first grating GR1 and the second grating GR2 may be widened to make the magnification of measurement higher, thus making it possible to perform a precise adjustment of parallelism. When the phase difference $\psi$ between the periodic signals E1 and E4 is eliminated, the light beam is properly parallelized, to complete the adjustment.

It should be noted that the distance adjustments in the directions of the X-axis and the Y-axis as shown in the figure, the gate adjustment being tilted as an axis in the X-direction or Y-direction, and the like are easily performed using a He-Ne laser beam as a reference axis.

In addition, the periodic signals E2 and E3 obtained from the respective photodiodes P2' and P3' play a role for stabilizing the measurement. More specifically, if the light has a poor parallelism, for example, even in the case of TAN $(\theta_{err}) > P/G$, the parallelism can be determined from the phase relationships of E1, E2, E3 and E4.

Since the apparatus measures the X-component of the parallelism of the light ray, it is possible to measure and adjust the error of the parallelism of the light ray in any direction by providing a mechanism which enables the light source unit LSU to revolve around the optical axis as a center.

For collimating the laser beam, it is also possible to add a controller for controlling the mechanism which shifts the positional relationship between the laser diode LD and the collimator lens CL based on the error of the parallelism of the litht ray determined by detecting and operation-processing the phase difference of the light intensity signals obtained from the photoelectric converting section LEC. In this case, the phase difference of, at least two light intensity signals are to be fed back to be zero, in order to eliminate the error of the parallelism. When the parallelism becomes free from error, the relative positional relationship between the laser diode LD and the collimator lens CL is optimized.

Furthermore, it is also possible that this controller may be provided with a function for controlling the revolving mechanism which rotates around the optical axis as a center the X-stage X-ST and Z-stage Z-ST as well as the light source unit LSU.

That precisions of the grating constants of the gratings, which affect the measurement accuracy of this invention, can be measured mechanically; and in addition, if only the grating constants of the two gratings have a same value, the difference from the desired grating constant does not make any difficulty to the adjustment.

In the embodiments detailed above, which two transmission typed gratings are employed to detect the transmitted light beam. However, it is also possible to detect a reflected light beam. The same effect is obtained, for example, by detecting the light beam reflected toward the light source unit using a reflecting type grating for the second grating.

There is another method in which a mirror is engaged as the second grating and the light beam which passes through the first grating after being reflected is detected. In this case, the error of the grating constant does not exert any influence upon the measurement accuracy, thus making it possible to effect a highly accurate measurement at a low cost.

In the foregoing, the present invention has been described in conjunction with the preferred embodiments illustrated in the drawings. It should be however be appreciated that the invention is not restricted to these embodiments. Various modification and variations will readily occur to those skilled in the art without departing from the spirit and scope of the invention.

What is claimed is:

1. A parallel light ray measuring apparatus comprising:
    a first grating;
    a second grating having the same grating period as that of said first grating, and disposed so that the grating lines thereof are in parallel with those of said first grating;
    a photoelectric converting means including at least two photoelectric converting elements for detecting a light beam which, having originated from a light source unit whose light rays are to be measured, has passed through both of said grating;
    a moving means for moving at least one of said first and second gratings in a transverse direction to the grating lines of said gratings on a plane to which the moving grating belongs; and
    a detecting means for detecting the phases of light intensity signals obtained from said at least two photoelectric converting elements, whereby the parallelism of the light rays of said light beam is measured using the light intensity signals obtained from said at least two photoelectric converting elements.

2. A parallel ray measuring apparatus as claimed in claim 1, further comprising a control means for controlling said moving means so that a phase difference of the light intensity signals obtained from said at least two photoelectric converting elements, is detected in order to be eliminated.

3. A parallel light ray measuring apparatus as claimed in claim 1, wherein said at least two photoelectric converting elements are arrayed along a line which parallels the surfaces of said gratings and is perpendicular to the grating lines.

4. A parallel light ray measuring apparatus as claimed in claim 1, further comprising a shifting means for shifting the relative positions between optical devices comprising said light source unit which emits said light beam.

5. A parallel light ray measuring apparatus as claimed in claim 1, further comprising a revolving means for rotating said light source around its optical axis as a center.

6. A parallel light ray measuring apparatus for measuring the parallelism of light rays emitted from a light source, said apparatus comprising:
- a first grating;
- a second grating having the same grating period as that of said first grating and disposed so that the grating lines thereof are in parallel with those of said first grating;
- a photoelectric converting means including at least two photoelectric converting elements for receiving light rays emitted from the light source, said rays having passed through both of said gratings;
- a moving means for moving one of said two gratings in a direction perpendicular to the plane of the grating moved by it; and
- a means for detecting a phase difference between signals output from two of said at least two photoelectric converting means, wherein the parallelism of the emitted light rays is determined by the equation:

$$\theta err = \text{Arc Tan} (\psi \cdot P/2\pi \cdot G)$$

wherein: $\theta err$ is the deviation angle of the light rays from parallel; $\psi$ is the phase difference between said two signals output by said at least two photoelectric converting means; P is the grating period of said gratings; and G is the gap between said two gratings.

7. An apparatus as recited in claim 6, further comprising another moving means for moving one of said two gratings in a direction parallel to the plane of the grating moved by it so as to vary said gap G between said gratings, thereby changing the sensitivity of the apparatus.

* * * * *